United States Patent [19]

Maus et al.

[11] Patent Number: 5,102,743
[45] Date of Patent: Apr. 7, 1992

[54] HONEYCOMB BODY, IN PARTICULAR WITH S-SHAPED, PARTIALLY REINFORCED LAYERS OF SHEET METAL

[75] Inventors: Wolfgang Maus; Helmut Swars, both of Bergisch Gladbach, Fed. Rep. of Germany

[73] Assignee: Emitec Gesellschaft für Emissionstechnologie mbH, Lohmar, Fed. Rep. of Germany

[21] Appl. No.: 564,384

[22] Filed: Aug. 8, 1990

[51] Int. Cl.⁵ .............................................. B01J 35/04
[52] U.S. Cl. .................................... 428/593; 428/603; 428/116; 428/119; 428/156; 502/439; 502/527
[58] Field of Search ............... 428/116, 119, 156, 164, 428/34.1, 593, 73, 72, 603; 502/439, 527

[56] References Cited

U.S. PATENT DOCUMENTS 4,273,681 6/1981 Nonnenmann ..................... 252/472
4,832,998 5/1989 Cyron ................................. 428/116

Primary Examiner—Ellis P. Robinson
Assistant Examiner—J. Weddington
Attorney, Agent, or Firm—Herbert L. Lerner; Laurence A. Greenberg

[57] ABSTRACT

A honeycomb body, especially a catalyst carrier body with a preferably round, oval or elliptical cross section, includes a jacket tube and a stack of at least partly structured sheet-metal layers being intertwined in different directions in the jacket tube. The stack has a given length dimension and a given width dimension. At least one of the sheet-metal layers has a greater thickness over at least part of at least one of the given dimensions than others of the layers. The at least one sheet-metal layer having a greater thickness is formed of thicker sheet metal than the others of the layers or it is formed of a plurality of identically structured metal sheets resting closely against one another.

22 Claims, 2 Drawing Sheets

HONEYCOMB BODY, IN PARTICULAR WITH S-SHAPED, PARTIALLY REINFORCED LAYERS OF SHEET METAL

CROSS-REFERENCE TO RELATED APPLICATIONS

This application is a continuation of PCT/EP88/01178, filed Dec. 19, 1988.

BACKGROUND OF THE INVENTION

The invention relates to a metal honeycomb body or structure, in particular a catalyst carrier body or support for internal combustion engines, with a preferably round, oval or elliptical cross section, including a stack of at least partly structured sheet-metal layers being intertwined in different directions in a jacket tube.

Such honeycomb bodies are known from Published European Application No. 0 245 737, corresponding to U.S. Pat. No. 4,832,998. With structured metal sheets wound or intertwined in opposite directions, a great number of different cross-sectional shapes can be filled out, producing bodies that are highly resistant to alternating thermal strains. The typical somewhat S-shape of the metal sheets is relatively elastic and makes it possible to join all the sheets at their ends to a jacket tube by joining techniques, which has considerable mechanical advantages over spirally wound honeycomb bodies.

However, with catalyst carrier bodies that are exposed to particularly heavy loads and with special shapes, the formation of a durable connection of the metal sheets to a jacket tube can present a problem. In such cases, after a relatively long-term strain, layers of sheet metal may separate in the vicinity of the jacket tube, which can unnecessarily shorten the service life of such a body.

It is accordingly an object of the invention to provide a honeycomb body, in particular with S-shaped, partly reinforced layers of sheet metal, which overcomes the hereinafore-mentioned disadvantages of the heretofore-known devices of this general type and which has a fastening to the jacket tube that is more resistant to separation.

With the foregoing and other objects in view there is provided, in accordance with the invention, a honeycomb body, especially a catalyst carrier body or structure preferably having a round, oval or elliptical cross section, comprising a jacket tube or tubular sheath, a stack or pile of at least partly structured sheet-metal layers or plates being intertwined in different directions in the jacket tube, the stack having a given length dimension and a given width dimension, and at least one of the sheet-metal layers having a greater thickness over at least part of at least one of the given dimensions than others of the layers, the at least one sheet-metal layer having a greater thickness being formed of thicker sheet metal than the others of the layers or being formed of a plurality of identically structured thinner metal sheets resting closely against one another.

In accordance with another feature of the invention, the stack has a middle, and the at least one sheet-metal layer having a greater thickness than the others of the layers includes one of the sheet-metal layers disposed approximately at the middle of the stack. This presents no problems in terms of production techniques, in particular because the greater thickness is attained by stacking together a great number of thin metal sheets. The reinforcement of the middle layer of sheet metal leads to a symmetrical structure of the resulting body, which is also advantageous in terms of force distribution.

In accordance with a further feature of the invention, the stack has an upper outer layer and a lower outer layer, and the at least one sheet-metal layer having a greater thickness than the others of the layers includes at least one of the outer layers. The use of thicker uppermost and lowermost sheet-metal layers in the stack, optionally in combination with a thicker middle layer, again leads to a very symmetrical structure of the resulting body. Since the uppermost and lowermost sheet-metal layers of the stack are additionally folded together while being wound in opposite directions, this alternative has the advantage of permitting a correspondingly thinner sheet-metal layer or a correspondingly lower number of metal sheets to be used, in order to attain the same thickness of the resulting ribs as when only the middle layer is thicker.

Therefore, the stack or pile of metal sheets has individual layers of greater thickness on its top and/or bottom and/or in its interior, either because thicker metal sheets are used, or because in this layer a plurality of identically structured thin metal sheets rest closely against one another.

In accordance with an added feature of the invention, the jacket tube has an oval or approximately elliptical shape giving the honeycomb body slightly rounded or slightly rounded and straight regions, and the at least one sheet-metal layer having a greater thickness than the others of the layers forms at least one approximately S-shaped connecting bridge between the regions, the at least one bridge jointly conducting forces acting on the outside of the honeycomb body into the interior thereof. Oval or elliptical shapes provide particular advantages. Since oval or elliptical shapes are vulnerable to deformation if the internal pressure varies, an approximately S-shaped connecting bridge between the straight or slightly rounded regions of the jacket tube is a structure that is particularly advantageous for the stability of this shape. Once again, the forces arising on the outside in the vicinity of the jacket tube are distributed substantially more uniformly into the interior of the catalyst carrier body by individual thicker layers, and among other advantages this also reduces the noise being generated.

In accordance with an additional feature of the invention, the at least one sheet-metal layer having a greater thickness than the others of the layers is in the form of smooth sheet-metal layers. While many different sheet-metal structures are known in the prior art for forming channels through which exhaust gas can pass, the most frequently used kind of structure is nevertheless an alternating layering of smooth and corrugated sheet-metal layers. In this case, it is suitable to reinforce some of the smooth sheet-metal layers. Smooth sheet-metal layers deform less under tensile strain than corrugated ones and can therefore transmit the resultant forces better than corrugated sheet-metal layers.

In accordance with yet another feature of the invention, the stack has an axial length as seen in axial direction of the honeycomb body, and the at least one sheet-metal layer having a greater thickness than the others of the layers does not extend over the entire width of the stack or in other words over the entire axial length of the honeycomb body but rather is discontinuous and includes at least one strip oriented in the axial direction. When the at least one strip is a plurality of strips, they are disposed in succession in the axial direction.

Therefore, the thicker layers may also include two or more individual strips, instead of filling the entire width of the stack, or in other words the entire axial depth of the resultant honeycomb body. The effect of these thicker layers of metal sheets is that because of their greater mechanical strength, they cannot be easily separated from the jacket tube. Moreover, these thicker layers can also firmly hold the layers of sheet metal adjoining them jointly, so that either these layers do not separate from the jacket tube, or at least they are firmly held by the thick layer despite separating.

In particular, it is advantageous for such strips to be inserted only on one or both end surfaces. On one hand, this economizes on material, but on the other hand it is suitable in terms of the various fastening possibilities and conventional brazing methods for catalyst carrier bodies, for example. With catalyst carrier bodies that are brazed only on the end surface, for instance, the desired success can be attained by providing sheet-metal layers that are thicker only on the end surface. Therefore, in accordance with yet a further feature of the invention, the stack has end surfaces, and the at least one strip has a width of substantially from 1 to 3 cm in the axial direction and is disposed at least at one of the end surfaces.

In principle, however, other arbitrary positions of the thicker sheet-metal layers within the catalyst carrier body are also possible, with the locations particularly depending on the size of the brazed zones between the jacket tube and the sheet-metal layers.

In accordance with a concomitant feature of the invention, the stack has end surfaces, the jacket tube and the stack are at least partly high-temperature brazed at least at one of the end surfaces, and the high-temperature brazing extends to a depth of substantially from 3 to 10 millimeters. High-temperature brazing that extends preferably to a depth of several millimeters is used on the end surface for specialized honeycomb bodies as well. If the individual layers of sheet metal in the stack are brazed to one another, preferably at one or both end surfaces, then the thicker layers conduct the tensile forces arising in the outer region in the vicinity of the jacket tube into the interior of the honeycomb body, so that the forces are distributed over substantially more connecting points, thereby considerably prolonging the service life of the body.

Other features which are considered as characteristic for the invention are set forth in the appended claims.

Although the invention is illustrated and described herein as embodied in a honeycomb body, in particular with S-shaped, partly reinforced layers of sheet metal, it is nevertheless not intended to be limited to the details shown, since various modifications and structural changes may be made therein without departing from the spirit of the invention and within the scope and range of equivalents of the claims, and also expressly applies to any cross-sectional shapes that can be filled with a stack of metal sheets wound in opposite directions.

The construction and method of operation of the invention, however, together with additional objects and advantages thereof will be best understood from the following description of specific embodiments when read in connection with the accompanying drawings.

Figure 1:
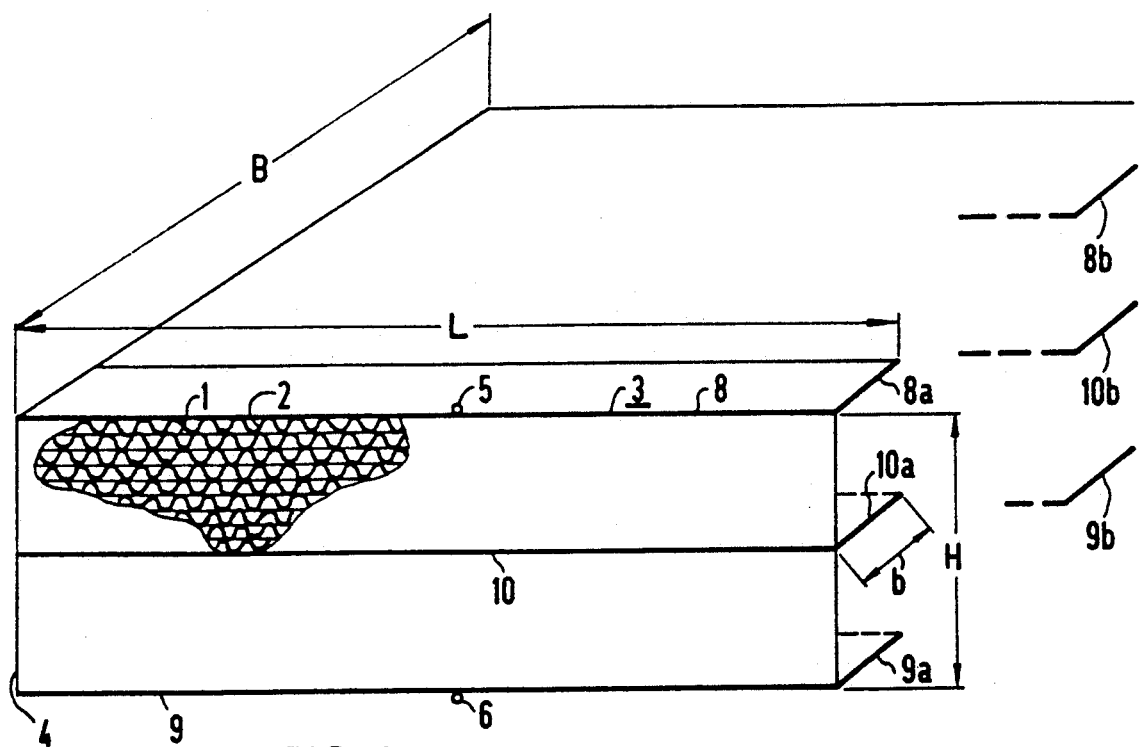
FIG. 1 is a fragmentary, diagrammatic, partly broken-away perspective view showing the structure of a sheet-metal stack of a type that is suitable for producing a honeycomb body according to the invention, in this case a round honeycomb body.

Referring now to the figures of the drawings in detail and first, particularly, to FIG. 1 thereof, there is seen a stack or pile 3 of alternatingly layered smooth metal sheets or plates 1 and corrugated metal sheets or plates 2, of a kind that is suitable for producing a honeycomb body or structure according to the invention. The stack 3 has a length dimension L, a height dimension H, and a width dimension B. The width B is equivalent to the axial length which the honeycomb body will later have, and the product of the length and the height is equivalent to the cross-sectional area which the finished honeycomb body will later have. Such a stack 3 can be wound in opposite directions about two fixed points 5 and 6, as is already known from the prior art. In this process, all or some regions of lateral ends 4 of the various sheet-metal layers can be joined to a jacket tube, in particular by high-temperature brazing. In many cases, the sheet-metal layers 1, 2 in the finished honeycomb body are also high-temperature brazed to one another, particularly in the vicinity of the end surfaces. According to the invention, some of the sheet-metal layers are thicker than others in the stack 3. For instance, in FIG. 1 an uppermost outer sheet-metal layer 8, a lowermost outer sheet-metal layer 9 and a middle sheet-metal layer 10 are thicker, either as the result of the use of thicker metal sheets or by layering a plurality of smooth sheets. All or some of these thicker sheet-metal layers may extend over the entire width B of the stack. However, as suggested in the present case, they may merely be constructed as strips 8a, 8b or 9a, 9b or 10a, 10b, which only extend over a portion b of the width B of the stack.

Figure 2:
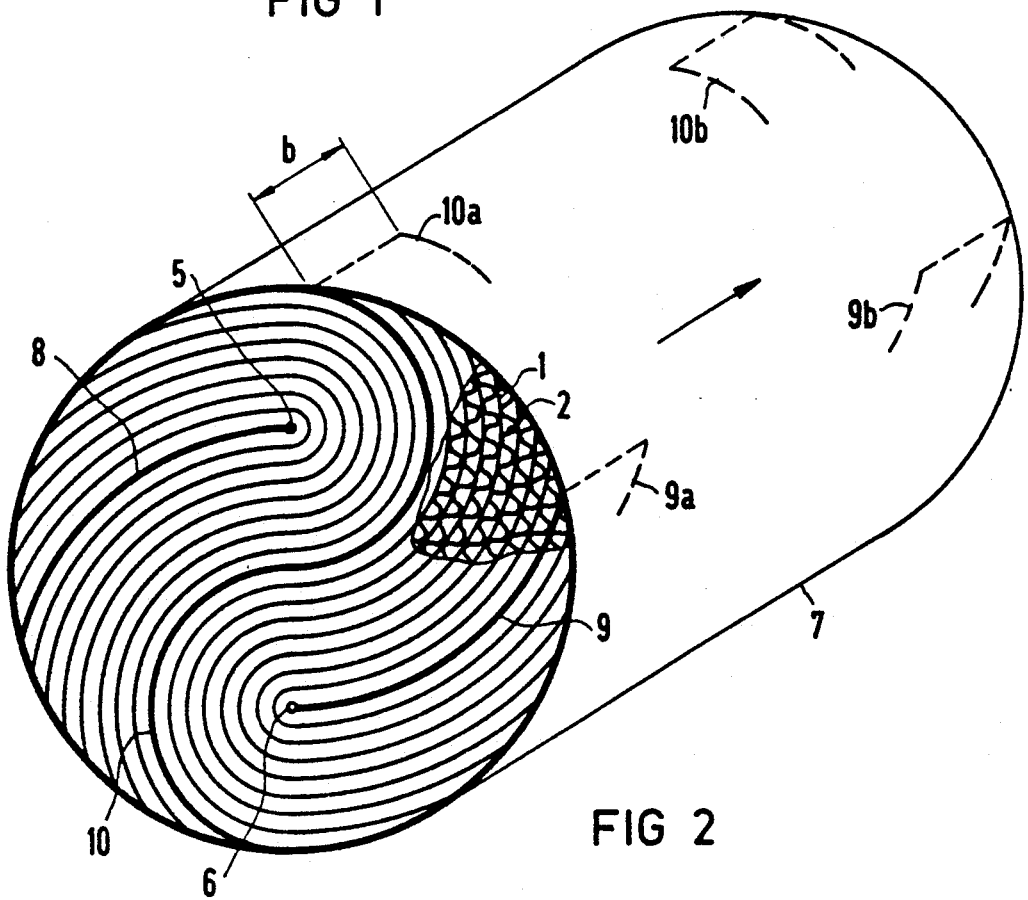
FIG. 2 is a partly broken-away perspective view of a honeycomb body produced by winding the stack shown in FIG. 1 in opposite directions.

FIG. 2 shows a honeycomb body of a type produced by contrary winding of the stack of FIG. 1 or intertwining the stack of FIG. 1 in different directions. The wound sheet-metal layers 1, 2 are disposed in a jacket tube or tubular sheath 7 and at least in some regions the layers are joined to the jacket tube by joining techniques, in particular by high-temperature brazing. Given this form of honeycomb body, the thicker layers or plates 8, 9, 10, which are likewise joined to the jacket tube 7 by joining techniques, can transmit forces from the outer region into the interior. In particular, these thicker layers 8, 9, 10 do not easily separate from the jacket tube 7 and as a result stabilize the layers adjoining them as well. As can easily be seen, in the finished honeycomb body, the originally uppermost and lowermost layers of the stack are bent about the fixed points 5 and 6 and as a result are given twice the thickness. This can be taken into account, particularly if a plurality of thin metal sheets is used, by providing that the uppermost and lowermost layer 8 or 9 of the stack 3 of FIG. 1 is made from a smaller number of metal sheets. As suggested by the diagrammatic perspective view in FIG. 2, the thicker sheet-metal layers 8, 9, 10 need not extend over the entire axial length of the honeycomb body represented by the arrow. The thicker layers 8, 9, 10 may, for instance, include two partial strips 9a, 9b or 10a, 10b having the width b and being disposed at the end surfaces.

The important factor is that the partial strips are joined to the jacket tube 7 by joining techniques and preferably also are connected with the layers adjoining them. It is particularly advantageous if the layers 1, 2, 8, 9, 10 are brazed to one another several millimeters deep at the end surfaces.

Figure 3:
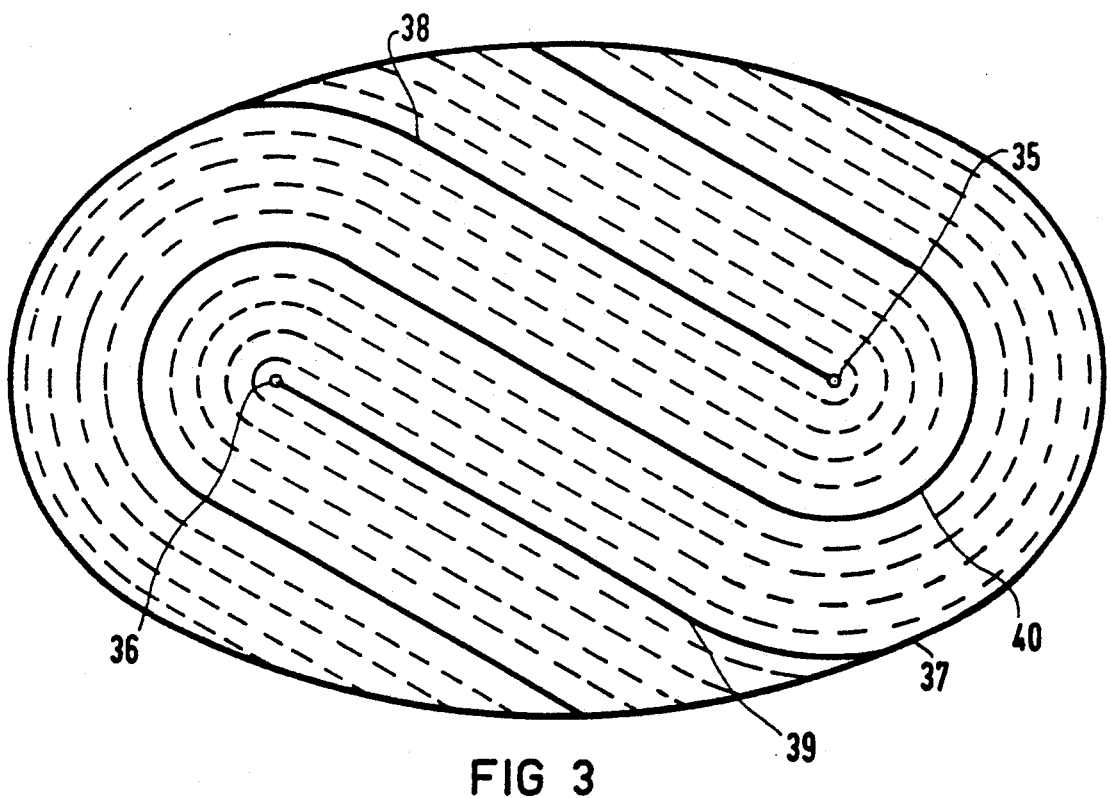
FIG. 3 is an end-elevational view of a honeycomb body according to the invention with an elliptical cross section.

Another exemplary embodiment, for which the use of the present invention is particularly well suited, is shown in FIG. 3 which shows a honeycomb body having an elliptical cross section. In this case the individual structured sheet-metal layers are merely suggested by broken lines. Some of the sheet-metal layers, once again namely an uppermost outer layer 38, a lowermost outer layer 39 and a middle layer 40 of the original stack from which this body has been made, are thicker than the other layers. Due to the firm connection of the thicker layers to the jacket tube 37, they stabilize the entire body and moreover, within certain limits, they prevent deformation of the jacket tube 37 as a result of high internal pressure. An elliptical honeycomb body of this kind, like many other shapes as well, can be made from a stack of structured metal sheets by intertwining the ends in different directions about the fixed points 35, 36. The only difference between the production of such a body and the production of honeycomb bodies with a round cross section, is the location of the fixed points and the form of the initial stack.

Figure 4:
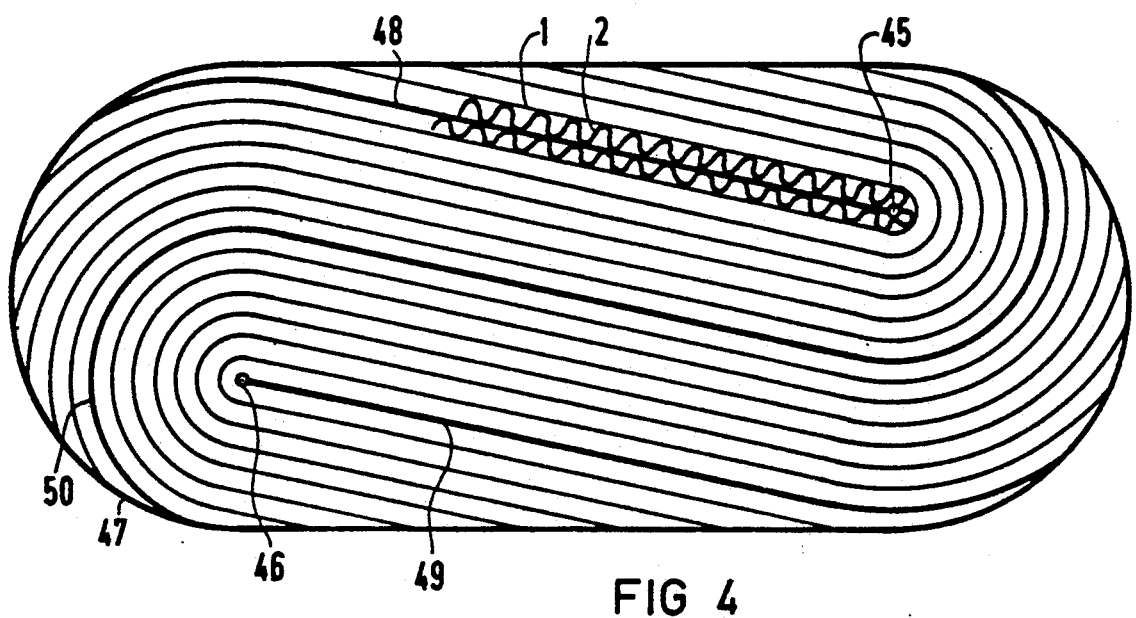
FIG. 4 is an end-elevational view of a honeycomb body according, to the invention with an oval cross sectional.

FIG. 4 shows a further exemplary embodiment in the form of honeycomb body having a jacket tube 47 with a so-called oval cross section. Bodies of this kind can also be made by intertwining a stack of structured metal sheets 1, 2 in different directions about fixed points 45, 46. In this exemplary embodiment as well, an uppermost outer layer 48, a lowermost outer layer 49 and a middle layer 50 are reinforced.

It is seen that when the jacket tube has an approximately oval or elliptical shape, the sheet-metal layer or layers 40, 50 of greater thickness form an approximately S-shaped connecting bridge or bridges between the straight or slightly rounded regions of the catalyst carrier body, which jointly carry forces acting on the outside of the catalyst carrier body into the interior thereof.

It should be noted that there exists a greater number of cross-sectional shapes that can be filled with stacks of structured metal sheets being contrary-wound or intertwined in different directions.

We claim:

1. Honeycomb body, comprising a jacket tube, a stack of at least partly structured sheet-metal layers being intertwined in said jacket tube, said stack having a given length dimension and a given width dimension, and at least one of said sheet-metal layers having at least twice the thickness over at least part of at least one of said given dimensions of others of said layers.

2. Honeycomb body according to claim 1, wherein said at least one sheet-metal layer having at least twice the thickness is formed of thicker sheet metal than said others of said layers.

3. Honeycomb body according to claim 1, wherein said at least one sheet-metal layer having at least twice the thickness is formed of at least two identically structured metal sheets resting closely against one another.

4. Honeycomb body according to claim 1, wherein said jacket tube has a round cross section.

5. Honeycomb body according to claim 1, wherein said jacket tube has an oval cross section.

6. Honeycomb body according to claim 1, wherein said jacket tube has an elliptical cross section.

7. Honeycomb body according to claim 1, wherein said stack has a middle, and said at least one sheet-metal layer having a greater thickness than said others of said layers includes one of said sheet-metal layers disposed approximately at said middle of said stack.

8. Honeycomb body according to claim 1, wherein said stack has an upper outer layer and a lower outer layer, and said at least one sheet-metal layer having a greater thickness than said others of said layers includes at least one of said outer layers.

9. Honeycomb body according to claim 7, wherein said stack has an upper outer layer and a lower outer layer, and said at least one sheet-metal layer having a greater thickness than said others of said layers includes at least one of said outer layers.

10. Honeycomb body according to claim 1, wherein said jacket tube has an approximately elliptical shape giving the honeycomb body slightly rounded and straight regions, and said at least one sheet-metal layer having a greater thickness than said others of said layers forms at least one approximately S-shaped connecting bridge between said regions, said at least one bridge conducting forces acting on the outside of the honeycomb body into the interior thereof.

11. Honeycomb body according to claim 1, wherein said jacket tube has an oval shape giving the honeycomb body slightly rounded regions, and said at least one sheet-metal layer having a greater thickness than said others of said layers forms at least one approximately S-shaped connecting bridge between said slightly rounded regions, said at least one bridge conducting forces acting on the outside of the honeycomb body into the interior thereof.

12. Honeycomb body according to claim 1, wherein said at least one sheet-metal layer having a greater thickness than said others of said layers is in the form of smooth sheet-metal layers.

13. Honeycomb body according to claim 1, wherein said stack has an axial length as seen in axial direction of the honeycomb body, and said at least one sheet-metal layer having a greater thickness than said others of said layers is discontinuous and includes at least one strip oriented in the axial direction.

14. Honeycomb body according to claim 13, wherein said at least one strip is a plurality of strips being disposed in succession in the axial direction.

15. Honeycomb body according to claim 13, wherein said stack has end surfaces, and said at least one strip has a width of substantially from 1 to 3 cm in the axial direction and is disposed at least at one of said end surfaces.

16. Honeycomb body according to claim 1, wherein said stack has end surfaces, and said jacket tube and said stack are at least partly high-temperature brazed at least at one of said end surfaces.

17. Honeycomb body according to claim 16, wherein said high-temperature brazing extends to a depth of substantially from 3 to 10 millimeters.

18. Catalyst carrier body, comprising a jacket tube, a stack of at least partly structured sheet-metal layers being intertwined in said jacket tube, said stack having a given length dimension and a given width dimension, and at least one of said sheet-metal layers having at least twice the thickness over at least part of at least one of said given dimensions of others of said layers.

19. Catalyst carrier body according to claim 18, wherein said at least one sheet-metal layer having at least twice the thickness is formed of thicker sheet metal than said others of said layers.

20. Catalyst carrier body according to claim 18, wherein said at least one sheet-metal layer having at least twice the thickness is formed of at least two identically structured metal sheets resting closely against one another.

21. Honeycomb body, comprising a jacket tube, a multiplicity of at least partly structured sheet-metal layers intertwined in said jacket tube, at least three of said sheet-metal layers having at least twice the thickness of others of said layers.

22. Honeycomb body, comprising a jacket tube, a multiplicity of at least partly structured sheet-metal layers intertwined in said jacket tube, at least three of said sheet-metal layers being formed of at least two identically structured metal sheets resting closely against one another.

* * * * *

UNITED STATES PATENT AND TRADEMARK OFFICE
CERTIFICATE OF CORRECTION

PATENT NO. : 5,102,743
DATED : April 7, 1992
INVENTOR(S) : Wolfgang Maus and Helmut Swars It is certified that error appears in the above-indentified patent and that said Letters Patent is hereby corrected as shown below:

On the title page, after item [22] Filed: insert the following:

—[63]   Related U.S. Application Data
   Continuation of PCT/EP88/01178, filed Dec. 19, 1988.

[30]   Foreign Application Priority Data
   Feb. 11, 1988   [DE]   Fed. Rep. of Germany .......... 8801788 —.

Signed and Sealed this

Twenty-fourth Day of August, 1993

Attest:

BRUCE LEHMAN

Attesting Officer

Commissioner of Patents and Trademarks